United States Patent
Li et al.

(10) Patent No.: US 11,875,532 B2
(45) Date of Patent: Jan. 16, 2024

(54) FEATURE POINT POSITION DETECTION METHOD AND ELECTRONIC DEVICE

(71) Applicant: Acer Incorporated, New Taipei (TW)

(72) Inventors: Yen-Hsien Li, New Taipei (TW); Shih-Ting Huang, New Taipei (TW); Chao-Shih Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/965,791

(22) Filed: Oct. 14, 2022

(65) Prior Publication Data

US 2023/0237695 A1   Jul. 27, 2023

(30) Foreign Application Priority Data

Jan. 24, 2022   (TW) .................................. 111102925

(51) Int. Cl.
*G06K 9/00* (2022.01)
*G06T 7/73* (2017.01)
*G06F 3/01* (2006.01)
*H04N 17/00* (2006.01)

(52) U.S. Cl.
CPC ................ *G06T 7/74* (2017.01); *G06F 3/013* (2013.01); *G06T 2207/10012* (2013.01); *G06T 2207/30201* (2013.01); *G06T 2207/30244* (2013.01); *H04N 17/002* (2013.01)

(58) Field of Classification Search
CPC .................................. G06F 3/011; G06F 3/013
See application file for complete search history.

(56) References Cited

U.S. PATENT DOCUMENTS

| | | | | |
|---|---|---|---|---|
| 2012/0087539 A1* | 4/2012 | Chen | ...................... | G06V 40/20 382/103 |
| 2016/0026253 A1* | 1/2016 | Bradski | ................ | H04N 13/128 345/8 |

FOREIGN PATENT DOCUMENTS

| | | |
|---|---|---|
| CN | 104272733 | 3/2017 |
| CN | 108307187 | 7/2018 |
| CN | 104811681 | 4/2019 |
| CN | 112929638 | 6/2021 |
| TW | 202123693 | 6/2021 |

\* cited by examiner

*Primary Examiner* — Nan-Ying Yang
(74) *Attorney, Agent, or Firm* — JCIPRNET

(57) ABSTRACT

The disclosure provides a feature point position detection method and an electronic device. The method includes: obtaining a plurality of first relative positions of a plurality of feature points on a specific object relative to a first image capturing element; obtaining a plurality of second relative positions of the plurality of feature points on the specific object relative to a second image capturing element; and in response to determining that the first image capturing element is unreliable, estimating a current three-dimensional position of each feature point based on a historical three-dimensional position and the plurality of second relative positions of each feature point.

18 Claims, 5 Drawing Sheets

FEATURE POINT POSITION DETECTION METHOD AND ELECTRONIC DEVICE

CROSS-REFERENCE TO RELATED APPLICATION

This application claims the priority benefit of Taiwan application serial no. 111102925, filed on Jan. 24, 2022. The entirety of the above-mentioned patent application is hereby incorporated by reference herein and made a part of this specification.

BACKGROUND

Field of the Disclosure

The present disclosure relates to an image processing mechanism, and more particularly, to a feature point position detection method and an electronic device.

Description of Related Art

The current naked-eye 3D display first places the pixels of the left eye and the right eye at the corresponding pixel positions of the display panel, then controls the optical path through the liquid crystal in the 3D lens, and projects the images in the left and right eyes to the corresponding eyes respectively. Because it is necessary to place focus on the left and right eyes, the 3D lens typically has an arc-shaped design, so that the images in the left (right) eye can be focused and projected to the left (right) eye. However, being restricted to the refracted optical path, some light might be projected into the wrong eye. That is to say, the image in the left (right) eye goes to the right (left) eye, and such phenomenon is called 3D crosstalk.

Generally speaking, a naked-eye 3D display is typically equipped with an eye-tracking system for providing corresponding images to both eyes after obtaining the positions of the user's eyes. At present, the most commonly used eye-tracking methods adopt dual-pupil camera for face recognition, and triangulation is adopted for measurement to obtain positions of eyes. However, in some cases, the facial recognition performed by the dual-pupil camera might not be able to accurately measure the position of the eyes due to insufficient facial feature points obtained, which might affect the quality of 3D image subsequently presented.

SUMMARY OF THE DISCLOSURE

In view of this, the present disclosure provides a feature point position detection method and an electronic device, which may be used to solve the above-mentioned technical problems.

The disclosure provides a feature point position detection method adaptable for an electronic device including a first image capturing element and a second image capturing element. The method includes: obtaining a plurality of first relative positions of a plurality of feature points on a specific object relative to the first image capturing element; obtaining a plurality of second relative positions of the plurality of feature points on the specific object relative to the second image capturing element; and in response to determining that the first image capturing element is unreliable, estimating a current three-dimensional position of each feature point based on a historical three-dimensional position and the plurality of second relative positions of each feature point.

The present disclosure provides an electronic device including a first image capturing element, a second image capturing element and a processor. The processor is coupled to the first image capturing element and the second image capturing element, and is configured to perform: obtaining a plurality of first relative positions of a plurality of feature points on a specific object relative to the first image capturing element; obtaining a plurality of second relative positions of the plurality of feature points on the specific object relative to the second image capturing element; and in response to determining that the first image capturing element is unreliable, estimating a current three-dimensional position of each feature point based on a historical three-dimensional position and the plurality of second relative positions of each feature point.

DESCRIPTION OF EMBODIMENTS

Figure 1:
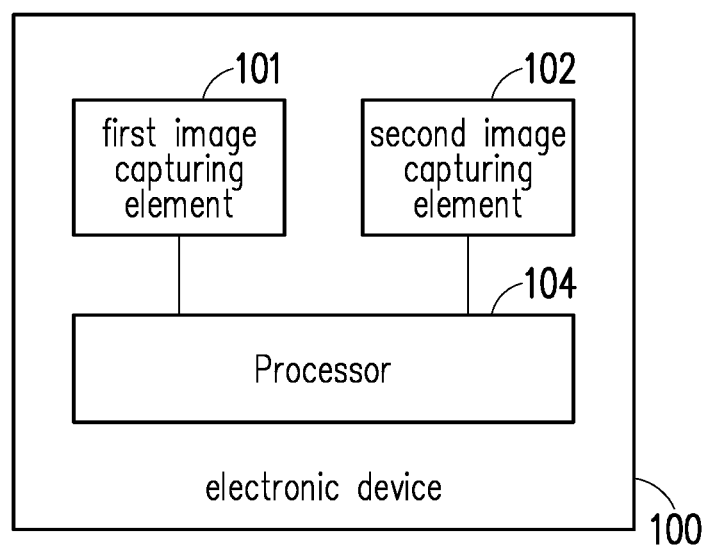
FIG. 1 is a schematic view of an electronic device according to an embodiment of the present disclosure.

Please refer to FIG. 1, which is a schematic view of an electronic device according to an embodiment of the present disclosure. In different embodiments, the electronic device 100 may be implemented as various smart devices and/or computer devices. In some embodiments, the electronic device 100 may be implemented as an eye-tracking device. In an embodiment, the electronic device 100 may be externally connected to, for example, a 3D display (such as a naked-eye 3D display), so as to provide relevant eye-tracking information for the 3D display. In another embodiment, the electronic device 100 may also be implemented as a 3D display with an eye-tracking function.

After obtaining the eye-tracking information, the electronic device 100 implemented as a 3D display may adjust the display content accordingly, so that the user viewing the 3D display may watch the display content of the 3D display with less interference of 3D crosstalk.

In FIG. 1, the electronic device 100 includes image capturing elements 101 and 102 and a processor 104. In different embodiments, the electronic device 100 may further include more image capturing elements coupled to the processor 104, the disclosure is not limited to the embodiment shown in FIG. 1.

In different embodiments, the first image capturing element 101 and the second image capturing element 102 are, for example, any image capturing devices having a charge coupled device (CCD) lens, a complementary metal oxide semiconductor transistors (CMOS) lens, but the disclosure is not limited thereto. In some embodiments, the first image capturing element 101 and the second image capturing element 102 may be integrally implemented as a dual-pupil camera in the electronic device 100, but the disclosure is not limited thereto.

The processor 104 is coupled to the first image capturing element 101 and the second image capturing element 102, and may be a general-purpose processor, a special-purpose processor, a conventional processor, a digital signal processor, a plurality of microprocessors, one or more microprocessors integrated with digital signal processor cores, a controller, a microcontroller, an application specific integrated circuit (ASIC), a field programmable gate array (FPGA), any other kind of integrated circuits, state machines, ARM (advanced RISC machine)-based processors, and the like.

In an embodiment of the present disclosure, the processor 104 accesses related modules and program codes to implement the eye-tracking method provided by the present disclosure, the details of which are described as follows.

Figure 2:
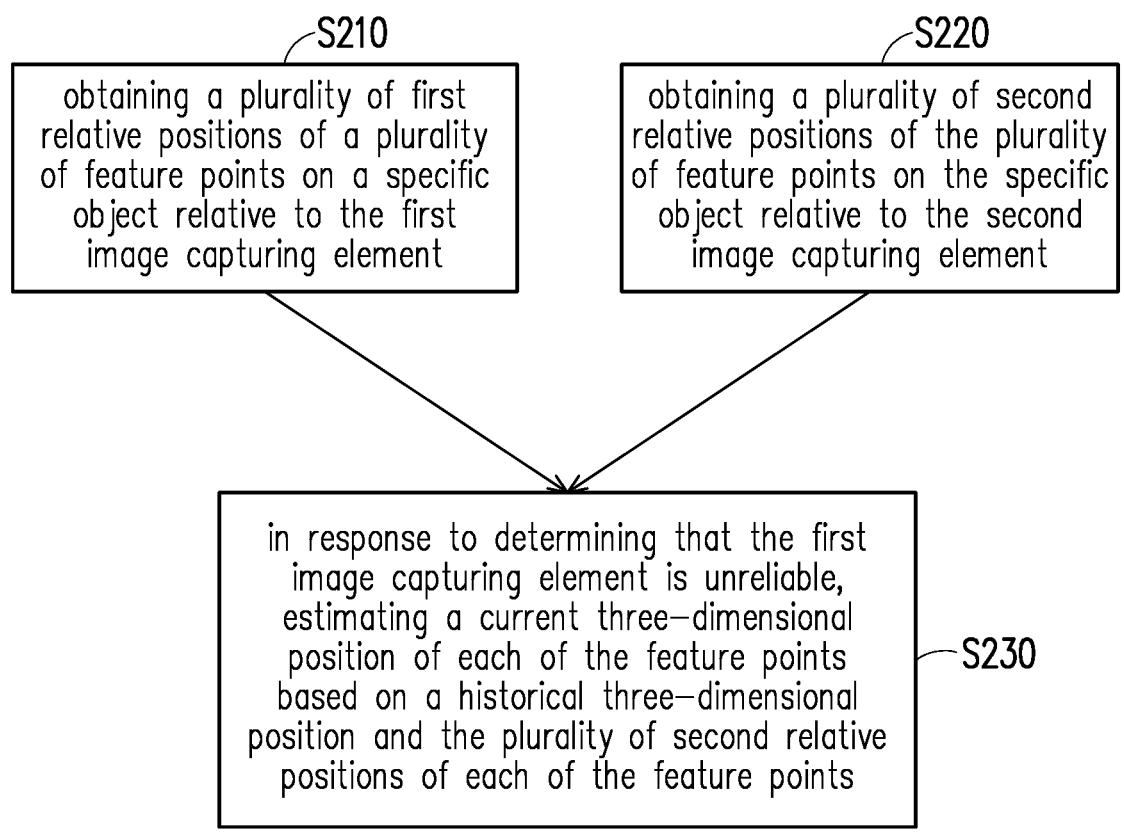
FIG. 2 is a flowchart of a feature point position detection method according to an embodiment of the present disclosure.

Please refer to FIG. 2, which is a flowchart of a feature point position detection method according to an embodiment of the present disclosure. The method of this embodiment may be executed by the electronic device 100 in FIG. 1, and the details of each step in FIG. 2 will be described below in conjunction with the elements shown in FIG. 1.

First, in step S210, the processor 104 obtains a plurality of first relative positions of a plurality of feature points on a specific object relative to the first image capturing element 101. For ease of description, it is assumed that the specific object concerned is a human face, and the multiple feature points on the specific object are, for example, multiple facial feature points on the human face, but the disclosure is not limited thereto.

In an embodiment, the processor 104 may control the first image capturing element 101 to capture a first image of the specific object concerned. Afterwards, the processor 104 may identify the feature points on the specific object in the first image, and determine a plurality of first relative positions of the feature points relative to the first image capturing element 101 accordingly.

Figure 3:
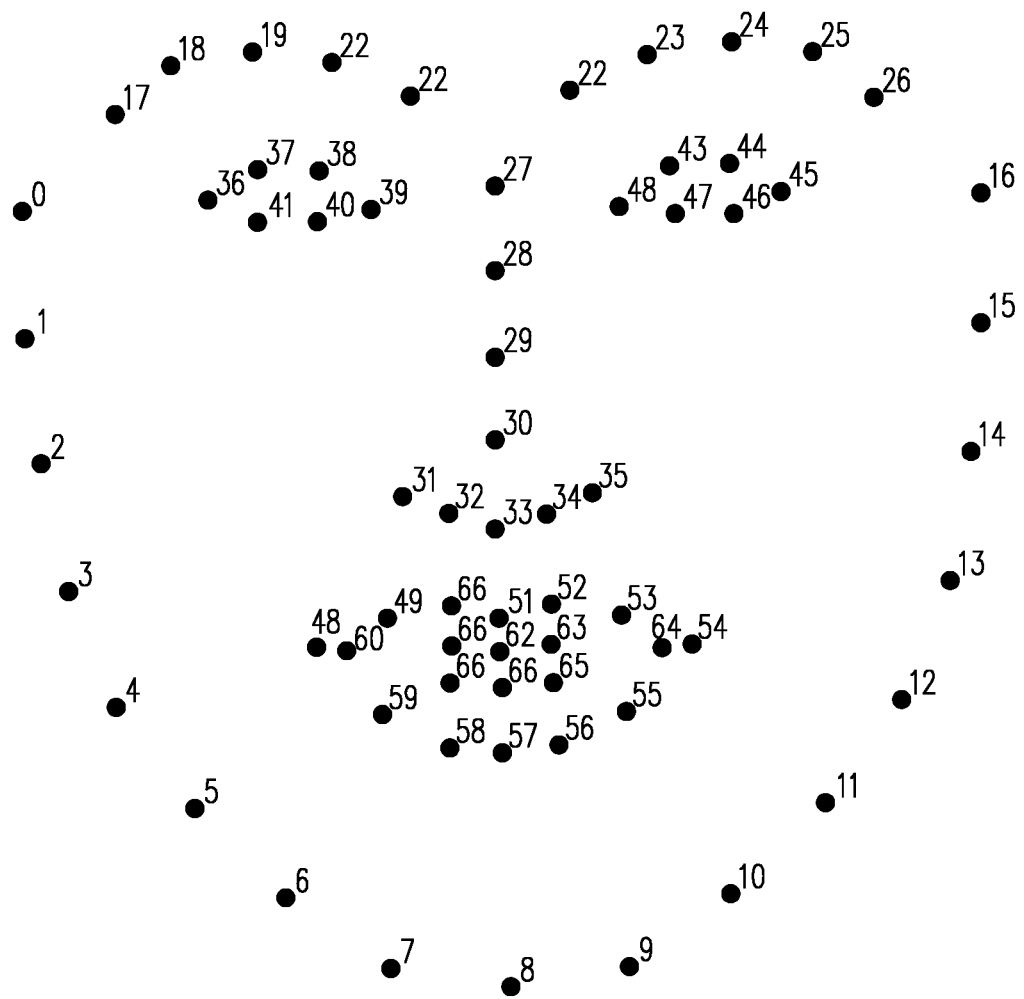
FIG. 3 is a schematic view of facial feature points according to an embodiment of the present disclosure.

Please refer to FIG. 3, which is a schematic view of facial feature points according to an embodiment of the present disclosure. In FIG. 3, it is assumed that the processor 104 finds a plurality of feature points as shown in FIG. 3 in the first image after the first image capturing element 101 captures the first image of the specific object concerned (i.e., the human face). In an embodiment, the processor 104 may find the plurality of feature points shown in the first image based on any known facial recognition algorithm, and correspondingly obtain the plurality of first relative positions of these feature points relative to the first image capturing element 101.

In an embodiment, the first relative position corresponding to each feature point may be characterized as, for example, a unit vector corresponding to each feature point. Taking the feature point numbered 0 in FIG. 3 (hereinafter referred to as feature point 0) as an example, the processor 104 may generate a corresponding unit vector correspondingly after finding the feature point 0, and this unit vector is a vector whose starting point is the three-dimensional position of the first image capturing element 101 (that is, the position of the first image capturing element 101 in the three-dimensional space), with the length of 1 and pointing at the feature point 0. Taking the feature point numbered 1 in FIG. 3 (hereinafter referred to as feature point 1) as an example, the processor 104 may generate a corresponding unit vector correspondingly after finding the feature point 1, and this unit vector is a vector whose starting point is the three-dimensional position of the first image capturing element 101, with the length of 1 and pointing at the feature point 1.

Based on the above principles, the processor 104 may, after acquiring each feature point in FIG. 3, find a unit vector corresponding to each feature point correspondingly.

In an embodiment, after finding the plurality of feature points in the first image, the processor 104 may further determine whether the first image capturing element 101 is reliable. In an embodiment, the processor 104 may determine whether the number of feature points in the first image is less than a predetermined threshold. If so, it means that there might be too few feature points in the first image, so the information obtained by the first image capturing element 101 might not be suitable for making judgment subsequently. Therefore, the processor 104 may determine that the first image capturing element 101 is unreliable accordingly.

On the other hand, if the number of feature points in the first image is not less than the predetermined threshold, it means that there are sufficient feature points in the first image, so the information obtained by the first image capturing element 101 is suitable for use in make judgments subsequently. Therefore, the processor 104 may determine that the first image capturing element 101 is reliable accordingly, but the disclosure is not limited thereto.

In addition, in step S220, the processor 104 obtains a plurality of second relative positions of the plurality of feature points on the specific object relative to the second image capturing element 102. In an embodiment, the processor 104 may control the second image capturing element 102 to capture a second image of the specific object concerned. Thereafter, the processor 104 may recognize the feature points on the specific object in the second image, and determine the plurality of second relative positions of the feature points relative to the second image capturing element 102 accordingly.

Similar to the concept of FIG. 3, after finding a plurality of feature points based on the second image, the processor 104 may correspondingly find a unit vector corresponding to each feature point as the second relative position corresponding to each feature point. For related details, reference may be made to the description of FIG. 3, and related description is not repeated.

In addition, in an embodiment, after finding a plurality of feature points in the second image, the processor 104 may further determine whether the second image capturing element 102 is reliable. In an embodiment, the processor 104 may determine whether the number of feature points in the second image is less than a predetermined threshold. If so, it means that there might be too few feature points in the second image, so the information obtained by the second image capturing element 102 might not be suitable for making judgment subsequently. Therefore, the processor 104 may determine that the second image capturing element 102 is unreliable accordingly.

On the other hand, if the number of feature points in the second image is not less than the predetermined threshold, it means that there are sufficient feature points in the second image, so the information obtained by the second image capturing element 102 is suitable for use in make judgments subsequently. Therefore, the processor 104 may determine that the second image capturing element 102 is reliable accordingly, but the disclosure is not limited thereto.

In some embodiments, if the processor 104 determines at a certain time point that both the first image capturing element 101 and the second image capturing element 102 are reliable, the processor 104 may perform feature matching and bundle adjustment based on the first relative position of the feature point corresponding to the first image capturing element 101 and second relative position of the feature point corresponding to the second image capturing element 102. Thereby, the current three-dimensional position of each feature point on the specific object may be found accordingly. For related details, please refer to the literature relevant to bundle adjustment method (such as "Chen, Yu & Chen, Yisong & Wang, Guoping. (2019). Bundle Adjustment Revisited."), and related description is not repeated.

In other embodiments, in response to determining that one of the first image capturing element 101 and the second image capturing element 102 is unreliable, the processor 104 may estimate the current three-dimensional position of each feature point based on one of the first image capturing element 101 and the second image capturing element 102 that is determined to be reliable and the historical three-dimensional position of each feature point on the specific object. For ease of description, in the following, it is assumed that the first image capturing element 101 is the one determined to be unreliable, but the assumption is only used as an example and should not be construed as limitation to possible implementations of the present disclosure.

Based on the above, in step S230, in response to determining that the first image capturing element 101 is unreliable, the processor 104 estimates the current three-dimensional position of each feature point based on the historical three-dimensional position and the plurality of second relative positions of each feature point.

In some embodiments, the historical three-dimensional position of each feature point is, for example, the current three-dimensional position of each feature point previously estimated/detected at a certain time point. For example, if the processor 104 determines that the first image capturing element 101 is unreliable at the t-th time point (t is an index value), the processor 104 may, for example, take the current three-dimensional position corresponding to each feature point at the t-k-th time point (k is a positive integer) as the historical three-dimensional position considered at the t-th time point, but the disclosure is not limited thereto.

In an embodiment, the processor 104 obtains the first distance between the feature points based on the historical three-dimensional positions of the feature points. After that, the processor 104 estimates a second distance between the second image capturing element 102 and each feature point based on the unit vector corresponding to each feature point and the first distance between the feature points. Next, the processor 104 estimates the current three-dimensional position of each feature point based on the three-dimensional position of the second image capturing element 102 and the second distance corresponding to each feature point. In order to make the above concept more comprehensible, a further description is provided below with reference to FIG. 4.

Figure 4:
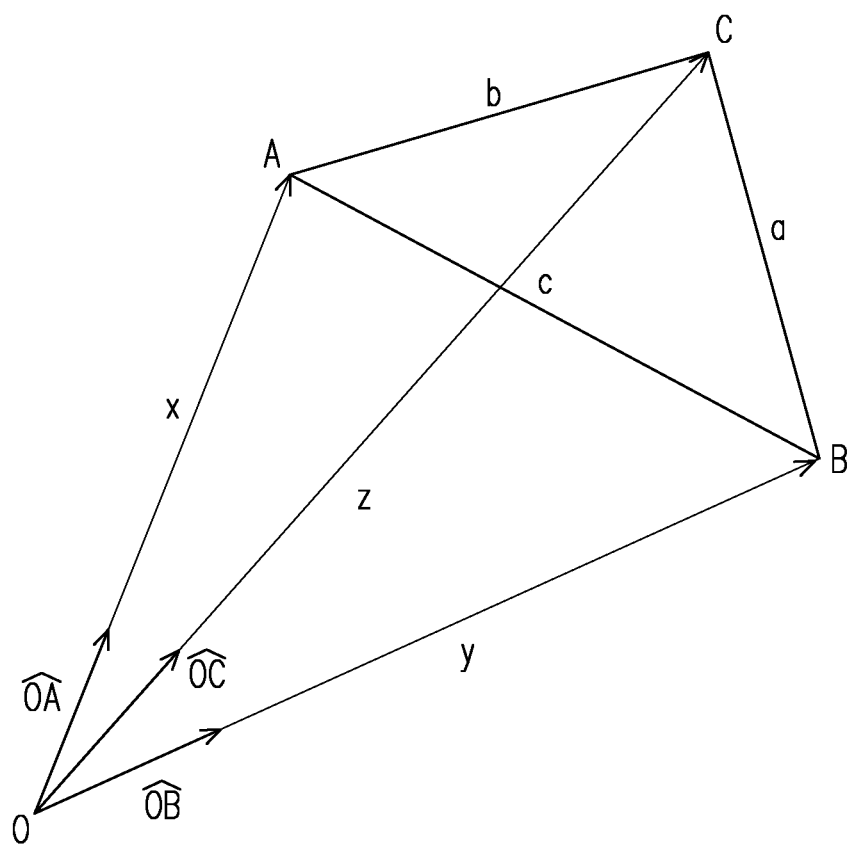
FIG. 4 is a schematic view of estimating the current three-dimensional position of each feature point according to an embodiment of the present disclosure.

Please refer to FIG. 4, which is a schematic view of estimating the current three-dimensional position of each feature point according to an embodiment of the present disclosure. In FIG. 4, it is assumed that the second image capturing element 102 has a three-dimensional position O at the t-th time point, and the processor 104 finds feature points A, B, and C based on the second image at the t-th time point. As mentioned above, after finding the feature points A, B, and C, the processor 104 may find the unit vector corresponding to each feature point A, B, and C correspondingly as the second relative positions corresponding to the feature points A, B, and C.

In FIG. 4, the second relative position between the feature point A and the second image capturing element 102 may be characterized as a unit vector $\overrightarrow{OA}$ which is, for example, a vector whose starting point is the three-dimensional position O, with the length of 1, and pointing at the feature point A. The second relative position between the feature point B and the second image capturing element 102 may be characterized as a unit vector $\overrightarrow{OB}$ which is, for example, a vector whose starting point is the three-dimensional position O, with the length of 1, and pointing at the feature point B. In addition, the second relative position between the feature point C and the second image capturing element 102 may be characterized as a unit vector $\overrightarrow{OC}$ which is, for example, a vector whose starting point is the three-dimensional position O, with the length of 1, and pointing at the feature point C.

In the embodiment of the present disclosure, it is assumed that the relative positions of the feature points A, B, and C are constant between the t-th time point and the t-k-th time point.

In this case, the processor 104 may, for example, obtain the first distance c between the feature points A and B based on the historical three-dimensional positions of the feature points A and B, obtain the first distance b between the feature points A and C based on the historical three-dimensional positions of the feature points A and C, and obtain the first distance a between the feature points B and C based on the historical three-dimensional positions of the feature points B and C.

In addition, in the scenario of FIG. 4, although the processor 104 may determine which direction the feature points A, B, and C are located in the three-dimensional position O (which can be acquired from the unit vectors $\overrightarrow{OA}$, $\overrightarrow{OB}$, $\overrightarrow{OC}$), it is currently impossible to acquire the second distance x between the three-dimensional position O and the feature point A, the second distance y between the three-dimensional position O and the feature point B, and the second distance z between the three-dimensional position O and the feature point C.

To obtain the second distances x, y, and z, the processor 104 may establish a plurality of relational expressions that may be used to calculate the second distances x, y, and z based on the geometric relationship shown in FIG. 4.

In an embodiment, the processor 104 may establish a plurality of relationships based on the unit vectors $\overrightarrow{OA}$, $\overrightarrow{OB}$, $\overrightarrow{OC}$, the first distances a, b, and c, and the second distances x, y, and z, and estimate the second distances x, y, and z based on these relational expressions.

In an embodiment, the processor 104 may establish the following relational expressions based on the cosine rule: "$a^2=y^2+z^2-2yz\ \overrightarrow{OB}\ \overrightarrow{OC}$", "$b^2=x^2+z^2-2xz\ \overrightarrow{OA}\ \overrightarrow{OC}$", and "$c^2=x^2+y^2-2xy\ \overrightarrow{OA}\ \overrightarrow{OB}$". Since the unit vectors $\overrightarrow{OA}$, $\overrightarrow{OB}$, $\overrightarrow{OC}$ and the first distances a, b, and c are all acquired, the processor 104 may obtain the second distances x, y, and z based on the solved relational expressions (which may be regarded as a simultaneous equation), but the disclosure is not limited thereto.

After obtaining the second distances x, y, and z, the processor 104 may determine the current three-dimensional positions of the feature points A, B, and C. Specifically, the processor 104 may be located in a direction corresponding to the unit vector $\overrightarrow{OA}$ and a position away from the three-dimensional position O by a second distance x may be used as the current three-dimensional position of the feature point A at the t-th time point. Moreover, the processor 104 may be located in a direction corresponding to the unit vector $\overrightarrow{OB}$ and a position away from the three-dimensional position O by a second distance y may be used as the current three-dimensional position of the feature point B at the t-th time point. Similarly, the processor 104 may be located in a direction corresponding to the unit vector $\overrightarrow{OC}$ and a position away from the three-dimensional position O by a second distance z may be used as the current three-dimensional position of the feature point C at the t-th time point.

In another embodiment, if the processor 104 determines that the second image capturing element 102 is unreliable at the t-th time point, the processor 104 may, for example, take the current three-dimensional position corresponding to each feature point at the t-k-th time point as the historical three-dimensional position considered at the t-th time point. Afterwards, the processor 104 may obtain the first distances between the feature points based on the historical three-dimensional positions of the feature points. Thereafter, the processor 104 estimates the second distance between the first image capturing element 101 and each feature point based on the unit vector corresponding to each feature point and the first distance between the feature points. Next, the processor 104 estimates the current three-dimensional position of each feature point based on the three-dimensional position of the first image capturing element 101 and the second distance corresponding to each feature point.

Specifically, the processor 104 may still estimate the current three-dimensional position of each feature point based on the relevant teaching in FIG. 4. In the previous embodiment, the three-dimensional position of the second image capturing element 102 is used as the three-dimensional position O in FIG. 4. However, when the second image capturing element 102 is determined to be unreliable, the processor 104 needs to make a change by using the three-dimensional position of the first image capturing element 101 as the three-dimensional position O in FIG. 4, and performs subsequent estimating operation accordingly. For related details, reference can be made to the teachings of the previous embodiments, and details are not repeated herein.

Figure 5:
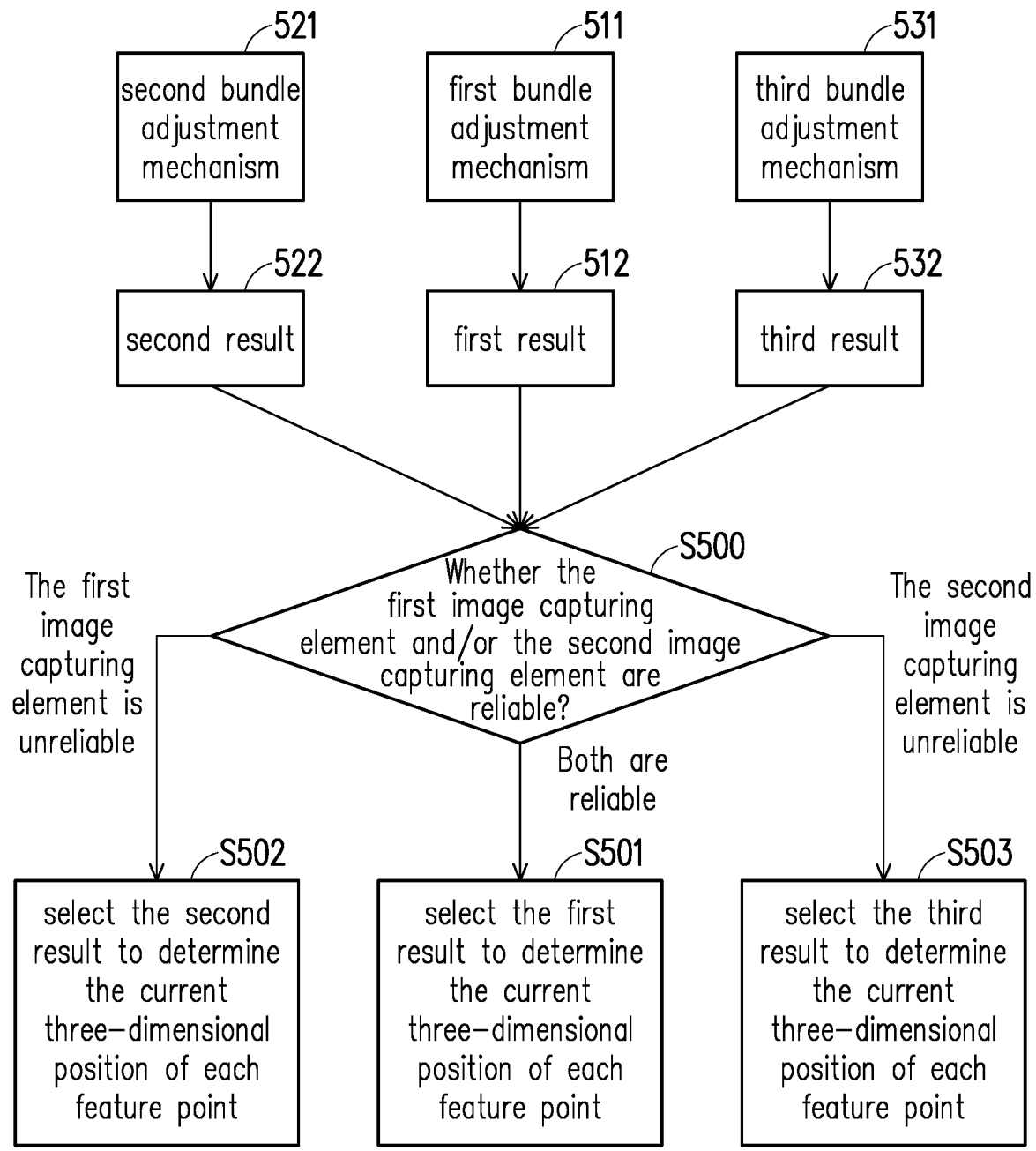
FIG. 5 is a diagram illustrating application scenario for determining the current three-dimensional position of each feature point according to an embodiment of the present disclosure.

Please refer to FIG. 5, which is a diagram illustrating application scenario for determining the current three-dimensional position of each feature point according to an embodiment of the present disclosure. In the embodiment of the present disclosure, it is assumed that the operation of the processor 104 in obtaining the current three-dimensional position of each feature point when both the first image capturing element 101 and the second image capturing element 102 are reliable may be referred to as a first bundle adjustment mechanism. Moreover, the operation of the processor 104 in obtaining the current three-dimensional position of each feature point when the first image capturing element 101 is unreliable may be called the second bundle adjustment mechanism. The operation of the processor 104 in obtaining the current three-dimensional position of each feature point when the second image capturing element 102 is unreliable may be called the third bundle adjustment mechanism.

In the scenario of FIG. 5, at each time point, the processor 104 may always execute the first bundle adjustment mechanism 511, the second bundle adjustment mechanism 521 and the third bundle adjustment mechanism 531 before determining whether the first image capturing element 101 and/or the second image capturing element 102 are reliable, so as to obtain the current three-dimensional position of each feature point corresponding to the first bundle adjustment mechanism 511 (hereinafter referred to as the first result 512), the current three-dimensional position of each feature point corresponding to the second bundle adjustment mechanism 521 (hereinafter referred to as the second result 522), and the current three-dimensional position of each feature point corresponding to the third bundle adjustment mechanism 531 (hereinafter referred to as the third result 532).

That is, before determining whether the first image capturing element 101 and/or the second image capturing element 102 are reliable, the processor 104 may firstly perform feature matching and bundle adjustment based on the first relative position of the feature point corresponding to the first image capturing element 101 and second relative position of the feature point corresponding to the second image capturing element 102, so as to find the current three-dimensional position of each feature point as the first result 512. Moreover, under the condition that the three-dimensional position of the second image capturing element 102 is taken as the three-dimensional position O in FIG. 4, the processor 104 may further obtain the current three-dimensional position of each feature point as the second result 522 based on the mechanism of FIG. 4. Furthermore, under the condition that the three-dimensional position of the first image capturing element 101 is taken as the three-dimensional position O in FIG. 4, the processor 104 may further obtain the current three-dimensional position of each feature point as the third result 532 based on the mechanism of FIG. 4.

Afterwards, the processor 104 may adaptively select the first, second or third result as the final result in step S500 according to whether the first image capturing element 101 and/or the second image capturing element 102 are reliable.

In an embodiment, if the processor 104 determines at the t-th time point that both the first image capturing element 101 and the second image capturing element 102 are reliable, the processor 104 may select the first result 512 in step S501 to determine the current three-dimensional position of each feature point (or may be understood as discarding the second and third results). In another example, if the processor 104 determines at the t-th time point that the first image capturing element 101 is unreliable, the processor 104 may select the second result 522 in step S502 to determine the current three-dimensional position of each feature point (or may be understood as discarding the first result 512 and the third result 532). Moreover, if the processor 104 determines at the t-th time point that the second image capturing element 102 is unreliable, the processor 104 may select the third result 532 in step S503 to determine the current three-dimensional position of each feature point (or may be understood as discarding the first result 512 and second result 522).

In other words, the processor 104 may always execute the first bundle adjustment mechanism 511, the second bundle adjustment mechanism 521, and the third bundle adjustment mechanism 531 at each time point, and then adaptively use the first result 512, the second result 522 or the third result 532 to determine the current three-dimensional position of each feature point.

In an embodiment, after determining the current three-dimensional position of each feature point at the t-th time point, the processor 104 may further process the current three-dimensional position of each feature point based on the concept of a Kalman filter (e.g., a linear Kalman filter) at the t-th time point. For example, the processor 104 may input the current three-dimensional position of each feature point respectively obtained from the t-m-th time point to the t-th time point into the Kalman filter (e.g., a linear Kalman filter), so as to correct the current three-dimensional position of each feature point at the t-th time point through the Kalman filter, but the disclosure is not limited thereto. For relevant details, reference may be made to the literature relevant to the Kalman filter, and related description is not repeated.

In an embodiment, after the processor 104 obtains a plurality of eye feature points of both eyes on the human face according to the above teachings, the three-dimensional display content of the 3D display may be determined based on these eye feature points. For example, the processor 104 may turn on the Lenticular lens on the 3D display and adjust the pixel positions on the 3D display. For details, please refer to the literature related to 3D rendering in the conventional technology, and the details are not described here. In this way, a user in front of the 3D display may not see a 3D image with high 3D crosstalk due to an unreliable image capturing element.

In an embodiment of the present disclosure, although the above exemplary description is provided based on 2 image capturing elements (that is, the first image capturing element 101 and the second image capturing element 102 in FIG. 1) and 3 feature points (that is, the feature points A, B, and C in FIG. 3), in other embodiments, the concept of the present disclosure may also be applied to a situation with more image capturing elements and more feature points, and the disclosure is not limited to the above embodiments.

Furthermore, although the above embodiments are described with a 3D display as an example, the concept of the embodiments of the present disclosure may be applied to any mechanism for detecting three-dimensional positions of feature points, and the disclosure is not limited to a 3D display.

To sum up, the embodiments of the present disclosure may first obtain the relative positions of a plurality of feature points on a specific object relative to each image capturing element, and when it is determined that a certain image capturing element is unreliable, the current three-dimensional position of each feature point may be estimated based on the historical three-dimensional position of each feature point and the relative position corresponding to another reliable image capturing element. In this way, a user in front of the 3D display may not see a 3D image with severe 3D crosstalk due to an unreliable image capturing element.

Although the present disclosure has been disclosed above by embodiments, it is not intended to limit the present disclosure. Anyone with ordinary knowledge in the technical field may make some changes and modifications without departing from the spirit and scope of the present disclosure. Therefore, the scope to be protected by the present disclosure shall be determined by the scope of the appended claims.

What is claimed is:

1. A feature point position detection method adaptable for an electronic device comprising a first camera and a second camera, and the method comprising:
   obtaining a plurality of first relative positions of a plurality of feature points on a specific object relative to the first camera;
   obtaining a plurality of second relative positions of the plurality of feature points on the specific object relative to the second camera; and
   in response to determining that the first camera is unreliable, estimating a current three-dimensional position of each of the feature points based on a historical three-dimensional position and the plurality of second relative positions of each of the feature points, wherein the plurality of second relative positions comprise a unit vector corresponding to each of the feature points, and the step of estimating the current three-dimensional position of each of the feature points based on the historical three-dimensional position and the plurality of second relative positions of each of the feature points comprises:
   obtaining a first distance between the plurality of feature points based on the historical three-dimensional position of each of the feature points;
   estimating a second distance between the second camera and each of the feature points based on the unit vector corresponding to each of the feature points and the first distance between the plurality of feature points;
   estimating the current three-dimensional position of each of the feature points based on a three-dimensional position of the second camera and the second distance corresponding to each of the feature points.

2. The feature point position detection method according to claim 1, wherein the step of obtaining the plurality of first relative positions of the plurality of feature points on the specific object relative to the first camera comprises:
   capturing, by the first camera, a first image of the specific object;
   identifying the plurality of feature points in the first image, and determining the plurality of first relative positions of the plurality of feature points relative to the first camera accordingly.

3. The feature point position detection method according to claim 2, comprising:
   in response to determining that the number of the plurality of feature points in the first images is less than a predetermined threshold, determining that the first camera is unreliable; and
   in response to determining that the number of the plurality of feature points in the first images is not less than the predetermined threshold, determining that the first camera is reliable.

4. The feature point position detection method according to claim 1, further comprising:
   in response to determining that both the first camera and the second camera are reliable, estimating the current three-dimensional position of each of the feature points based on the plurality of first relative positions and the plurality of second relative positions.

5. The feature point position detection method according to claim 1, wherein the plurality of feature points comprise a first feature point, a second feature point and a third feature point, and the second camera has a first unit vector, a second unit vector and a third unit vector respectively corresponding to the first feature point, the second feature point and the third feature point, and the step of estimating the second distance between the second camera and each of the feature points based on the unit vector corresponding to each of the feature points and the first distance between the plurality of feature points comprises:
   establishing a plurality of relational expressions based on the first unit vector, the second unit vector, the third unit vector, the first distance between the first feature point and the second feature point, the first distance between the second feature point and the third feature point, the first distance between the first feature point and the third feature point, the second distance between the second camera and the first feature point, the second distance between the second camera and the second feature point, and the second distance between the second camera and the third feature point;

estimating the second distance between the second camera and the first feature point, the second distance between the second camera and the second feature point, and the second distance between the second camera and the third feature point based on the plurality of relational expressions.

6. The feature point position detection method according to claim 5, wherein the plurality of relational expressions comprise:

$$a^2 = y^2 + z^2 - 2yz\,\overrightarrow{OB}\cdot\overrightarrow{OC};$$

$$b^2 = x^2 + z^2 - 2xz\,\overrightarrow{OA}\cdot\overrightarrow{OC};$$

$$c^2 = x^2 + y^2 - 2xy\,\overrightarrow{OA}\cdot\overrightarrow{OB};$$

wherein $\overrightarrow{OA}$ is the first unit vector corresponding to the first feature point, $\overrightarrow{OB}$ is the second unit vector corresponding to the second feature point, $\overrightarrow{OC}$ is the third unit vector corresponding to the third feature point, a is the first distance between the second feature point and the third feature point, b is the first distance between the first feature point and the third feature point, c is the first distance between the first feature point and the second feature point, x is the second distance between the second camera and the first feature point, y is the second distance between the second camera and the second feature point, and z is the second distance between the second camera and the third feature point.

7. The feature point position detection method according to claim 5, wherein the plurality of second relative positions are obtained at a t-th time point, the historical three-dimensional position of each of the feature points is obtained at a t-k-th time point, t is an index value, k is a positive integer, and relative positions of the first feature point, the second feature point and the third feature point are constant from the t-th time point to the t-k-th time point.

8. The feature point position detection method according to claim 1, wherein the electronic device is a three-dimensional display, and the first camera and the second camera belong to a dual-pupil camera in the three-dimensional display.

9. The feature point position detection method according to claim 8, wherein the specific object is a human face, and after the step of estimating the current three-dimensional position of each of the feature points based on the historical three-dimensional position and the plurality of second relative positions of each of the feature points, the method further comprises:
obtaining a plurality of eye feature points corresponding to eyes on the human face; and
determining a three-dimensional display content of the three-dimensional display based on the plurality of eye feature points.

10. An electronic device, comprising:
a first camera;
a second camera; and
a processor, coupled to the first camera and the second camera and configured to perform:
obtaining a plurality of first relative positions of a plurality of feature points on a specific object relative to the first camera;
obtaining a plurality of second relative positions of the plurality of feature points on the specific object relative to the second camera; and
in response to determining that the first camera is unreliable, estimating a current three-dimensional position of each of the feature points based on a historical three-dimensional position and the plurality of second relative positions of each of the feature points, wherein the plurality of second relative positions comprise a unit vector corresponding to each of the feature points, and the processor performs:
obtaining a first distance between the plurality of feature points based on the historical three-dimensional position of each of the feature points;
estimating a second distance between the second camera and each of the feature points based on the unit vector corresponding to each of the feature points and the first distance between the plurality of feature points;
estimating the current three-dimensional position of each of the feature points based on a three-dimensional position of the second camera and the second distance corresponding to each of the feature points.

11. The electronic device according to claim 10, wherein the processor performs:
capturing, by the first camera, a first image of the specific object;
identifying the plurality of feature points in the first image, and determining the plurality of first relative positions of the plurality of feature points relative to the first camera accordingly.

12. The electronic device according to claim 11, wherein the processor performs in response to determining that the number of the plurality of feature points in the first images is less than a predetermined threshold, determining that the first camera is unreliable; and
in response to determining that the number of the plurality of feature points in the first images is not less than the predetermined threshold, determining that the first camera is reliable.

13. The electronic device according to claim 10, wherein the processor further performs:
in response to determining that both the first camera and the second camera are reliable, estimating the current three-dimensional position of each of the feature points based on the plurality of first relative positions and the plurality of second relative positions.

14. The electronic device according to claim 10, wherein the plurality of feature points comprise a first feature point, a second feature point and a third feature point, and the second camera has a first unit vector, a second unit vector and a third unit vector respectively corresponding to the first feature point, the second feature point and the third feature point, and the processor performs:
establishing a plurality of relational expressions based on the first unit vector, the second unit vector, the third unit vector, the first distance between the first feature point and the second feature point, the first distance between the second feature point and the third feature point, the first distance between the first feature point and the third feature point, the second distance between the second camera and the first feature point, the second distance between the second camera and the second feature point, and the second distance between the second camera and the third feature point;
estimating the second distance between the second camera and the first feature point, the second distance between the second camera and the second feature point, and the second distance between the second camera and the third feature point based on the plurality of relational expressions.

15. The electronic device according to claim 14, wherein the plurality of relational expressions comprise:

$$a^2 = y^2 + z^2 - 2yz\,\overrightarrow{OB}\cdot\overrightarrow{OC};$$

$$b^2 = x^2 + z^2 - 2xz\,\overrightarrow{OB}\cdot\overrightarrow{OC};$$

$$c^2 = x^2 + y^2 - 2xy\,\overrightarrow{OA}\cdot\overrightarrow{OB};$$

wherein $\overrightarrow{OA}$ is the first unit vector corresponding to the first feature point, $\overrightarrow{OB}$ is the second unit vector corresponding to the second feature point, $\overrightarrow{OC}$ is the third unit vector corresponding to the third feature point, a is the first distance between the second feature point and the third feature point, b is the first distance between the first feature point and the third feature point, c is the first distance between the first feature point and the second feature point, x is the second distance between the second camera and the first feature point, y is the second distance between the second camera and the second feature point, and z is the second distance between the second camera and the third feature point.

16. The electronic device according to claim 14, wherein the plurality of second relative positions are obtained at a t-th time point, the historical three-dimensional position of each of the feature points is obtained at a t-k-th time point, t is an index value, k is a positive integer, and relative positions of the first feature point, the second feature point and the third feature point are constant from the t-th time point to the t-k-th time point.

17. The electronic device according to claim 10, wherein the electronic device is a three-dimensional display, and the first camera and the second camera belong to a dual-pupil camera in the three-dimensional display.

18. The electronic device according to claim 17, wherein the specific object is a human face, and after estimating the current three-dimensional position of each of the feature points based on the historical three-dimensional position and the plurality of second relative positions of each of the feature points, the processor further performs:

obtaining a plurality of eye feature points corresponding to eyes on the human face; and determining a three-dimensional display content of the three-dimensional display based on the plurality of eye feature points.

\* \* \* \* \*